United States Patent
Willis et al.

(10) Patent No.: US 6,584,082 B1
(45) Date of Patent: Jun. 24, 2003

(54) APPARATUS, METHOD AND ARTICLE OF MANUFACTURE FOR TRANSMITTING DATA OVER A SATELLITE

(75) Inventors: Edward D. Willis, Plano, TX (US); James L. Howser, Rowlett, TX (US); Martin M. Garrity, Englewood, CO (US); John C. Heneghan, Colorado Springs, CO (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/232,266

(22) Filed: Jan. 15, 1999

Related U.S. Application Data (60) Provisional application No. 60/071,755, filed on Jan. 16, 1998.

(51) Int. Cl.[7] .............................. H04B 7/185; H04J 1/00; H04H 1/00
(52) U.S. Cl. ................. 370/316; 370/326; 370/487; 455/3.02; 455/422; 455/426
(58) Field of Search ................ 370/310, 312, 370/313, 314, 321, 322, 326, 337, 347, 325, 316, 349, 486, 487; 455/3.01, 3.02, 12.1, 427, 422, 426; 709/217, 201

(56) References Cited

U.S. PATENT DOCUMENTS

| | | | | |
|---|---|---|---|---|
| 5,673,256 A | * | 9/1997 | Maine | 370/271 |
| 5,838,668 A | * | 11/1998 | Okada et al. | 370/312 |
| 5,968,129 A | * | 10/1999 | Dillon et al. | 709/233 |
| 5,991,306 A | * | 11/1999 | Burns et al. | 370/429 |
| 6,021,307 A | * | 2/2000 | Chan | 455/3.1 |
| 6,101,180 A | * | 8/2000 | Donahue et al. | 370/352 |
| 6,272,658 B1 | * | 8/2001 | Steele et al. | 714/752 |
| 6,385,647 B1 | * | 5/2002 | Willis et al. | 709/217 |

* cited by examiner

*Primary Examiner*—Duc Nguyen (57) ABSTRACT

Calls are routed in a hybrid telecommunications system including a switched communications network and a packet transmission network. A gateway server provides file transfer services in response to a user initiating a call. Calls and data are routed over a hybrid network including a satellite facility. The satellite facility receives data streams at a stream gateway, receives data files and stores and forwards the data files to file gateways as directed by a scheduling service according to the subscriber and the data. All data is multiplexed with authentication and session information and transmitted through orbiting satellite links or the Internet to a receiving facility. Transmission status is returned to the transmitting facility and the data is retransmitted accordingly. The receiving facility decodes the satellite transmission data and transmits the data to client device(s) as directed by a scheduling service according to the subscriber and the data.

14 Claims, 9 Drawing Sheets

APPARATUS, METHOD AND ARTICLE OF MANUFACTURE FOR TRANSMITTING DATA OVER A SATELLITE

CROSS-REFERENCE TO RELATED APPLICATION

This application is related to U.S. patent application Ser. No. 08/746,901, filed Nov. 18, 1996, entitled System, Method and Article of Manufacture For Selecting a Gateway of a Hybrid Communication System Architecture, to Elliot, which is incorporated by reference in its entirety.

This application claims the benefit of U.S. Provisional Application No. 60/071,755, filed Jan. 16, 1998.

COPYRIGHT NOTIFICATION

Portions of this patent application contain materials that are subject to copyright protection. The copyright owner has no objection to the facsimile reproduction by anyone of the patent document, or the patent disclosure as it appears in the Patent and Trademark Office.

FIELD OF THE INVENTION

This invention generally relates to improvements in computer systems, and, more specifically, to utilizing satellite broadcast technology as a bridge between telephony operations and the Internet.

BACKGROUND OF THE INVENTION

Traditionally, data has been delivered to network-connected desktop personal computers either by broadcasting or unicasting, while the need for multicasting data has been unsatisfied. Broadcasting is a form of addressing wherein the destination address specifies all destinations; all destinations indiscriminately receive the data whether or not the data is needed by the destination computer. Where data is not needed at a particular network-connected personal computer, the transmission of the data is an inefficient use of resources. This can be particularly disabling to a network that does not have sufficient bandwidth capacity for all of the data traffic. Broadcasting is less efficient in direct relation to the proportion of users in the community of the broadcast that do not need the broadcast data.

In contrast, unicasting is a form of addressing where the destination address specifies a single destination. Unicasting eliminates the unnecessary transmission of data to destinations that have no need for the data, but is still inefficient because the data will be replicated on the network for each individual destination. For example, when data is transmitted to 20 personal computers connected to a server, 20 transmissions of the data will be made each with a different individual destination address.

Where data needs to be transmitted to a limited set of all network-connected personal computers, transmission-using broadcasting or unicasting falls short of efficient resource use. Multicasting offers more efficient resource use. Multicasting is a form of addressing wherein a source sends data to a server and the server sends one copy of the data to each of the destination computers. This form of addressing is particularly beneficial where the link between the source and the server has limited capacity or high cost because only one copy of the data that is intended for multiple recipients is transmitted to the server. Multicasting makes the most efficient use of an expensive link or a link that has insufficient capacity for transmission to multiple destinations by reducing the number of transmissions across the critical link to one, rather than requiring that multiple transmissions be made for each destination address.

One arena where multicasting is implemented is the Internet. Multimedia applications involve text, graphics, voice, video and hypertext operations. Multimedia applications typically require large amounts of data in comparison to traditional computer applications. The Internet has increasingly become the communication network of choice for the consumer marketplace. Multimedia applications exist on the Internet, but the throughput of the Internet limits the usefulness of multimedia applications because multimedia applications are highly interactive and require higher throughput than the Internet can provide. The limitations on bandwidth make the Internet more suitable and efficient for low bandwidth applications such as E-mail and smaller multimedia applications.

The Multicast backbone (MBONE) is a virtual network on top of the Internet which supports routing of Internet Protocol (IP) multicast packets, intended for multimedia transmission. MBONE enables public access to desktop video communications. However, the quality is poor, with only 3–5 frames per second instead of the 30 frames per second of commercial television. Therefore, transmission of multimedia data via the Internet is too slow, even using multicasting.

Two independent technologies have emerged that provide greater speed and throughput (Internet Protocol (IP) Multicast and Digital Video Broadcast) that together have the potential to provide for transmission of multimedia information over a network. IP Multicast is an important advance in IP networking that has been under development since the early 1990's but is only now receiving broad (and growing) practical industry backing through the commercial availability of network infrastructure elements.

An extension of standard IP, IP Multicast allows applications to send one copy of information to a group address, and have the information transmitted to each recipient of the group requiring receipt of the information. IP Multicast is more efficient than point-to-point unicast because the source need send only once, and more efficient than broadcast since only interested nodes are impacted by transmission of the information. IP Multicast thus scales well as the number of participant and collaborations expand, and it integrates well with other new IP protocols and services, such as Quality of Service requests to support real-time multimedia.

However, despite the advantages of IP Multicast, its terrestrial implementation may be slow because all routers between the sender and the receivers must be IP Multicast enabled. Even then, network bandwidth may be limited for some considerable time. The demand of consumers for digital satellite TV systems has driven the development of Direct Broadcast Satellite (DBS) systems that can broadcast directly to small, low cost receiver equipment. The standard likely to become dominant on a global basis is Digital Video Broadcast (DVB) which was developed by the European Broadcasting Union.

DVB specifies standards for the digital broadcast of video, sound and data across satellite (DVB-S), cable (DVB-C) and SMATV (DVB-CS) data link layers. DVB specifies common conformance standards at several levels including channel coding (Reed-Soloman forward error correction), transport layer (MPEG-2 Systems Transport bitstream) and elementary stream layers (MPEG-2 for video encoding and MPEG-1 for audio encoding). An elemental stream is a single, digitally coded component of a multimedia channel (e.g. a single coded video or audio stream). MPEG-2 elemental stream encoding thus provides good VHS quality video at 1.5–2 Megabits and studio production quality video at approximately 6–8 Megabits.

MPEG-2 transport enables video, audio and data to be multiplexed onto the physical channel of choice, with DVB specifying the remaining system elements for each transport media being used. For example, with satellite communications, DVB specifies the physical channel (single 38 Megabits satellite transponder), signal/noise ratio and channel coding (e.g. 2 bit/symbol QPSK modulation).

Satellite communications offer sufficient bandwidth for remote multimedia applications. However, satellite connections for the typical computer user are practically non-existent and expensive and do not allow for use of economical open client/server technologies. A client/server architecture is an economical, proven and common form of distributed system wherein software is split between server tasks and client tasks. A client sends requests to a server, according to some protocol, asking for information or action, and the server responds. There may be either one centralized server or several distributed ones. This model allows clients and servers to be placed independently on nodes in a network, possibly on different hardware and operating systems appropriate to their function, e.g. fast server with an inexpensive client.

There is a rapidly increasing market demand for network based application services that enable the efficient operation of computer applications which are one-to-many in their information flow and which require high network bandwidth. Major advances in digital transmission, encoding and internetworking technology and the advent of direct broadcast satellite have matched this. This market need, combined with the emerging technological capability, has prompted development in accordance with a preferred embodiment. The engineering challenge was to develop a system solution that makes optimum use of emerging digital broadcast technology such as DVB/MPEG while seamlessly integrating into an emerging IP Multicast standard for data technology. With such an emergent service, the architecture of any solution must also be scaleable from an early system for deployment as part of an individual customer solution, through to a multi-customer service platform capable of simultaneously supporting multiple large business customers.

There are two basic models for delivery of information to end users: (a) information can be requested by the end user of a central source (pull model), or (b) information can be sent from the central source to the end user (push model). Established LAN and WAN technologies, applications and services are very efficient at supporting the pull model of information flow. However, as advanced information technology becomes critical to organizations, there is a rapidly increasing market demand for information technology and network services that efficiently enable push oriented, one-to-many information flow.

In addition, even when data compression is used, the increasingly multimedia nature of applications requires high bandwidth support of a one-to-many information flow. And even many non-multimedia applications require high bandwidth for the timely transfer of large files of information. The concept of multicasting was originally developed to provide application and inter-network services in response to a demand for high bandwidth one-to-many services. Multicasting utilizes the natural broadcast capabilities of a satellite infrastructure, while smoothly integrating with existing and emerging terrestrial data network services and pull oriented application services.

A solution to the problems of transmitting multimedia and supporting call processing across the economical Internet while utilizing the high throughput of orbital satellites would integrate the Internet and satellites into a hybrid telecommunications system using client/server technologies.

The present invention relates to the integration of satellite transmission facilities with the Internet and telephony systems, and more specifically, to a system, method and article of manufacture for using the Internet and satellite transmissions as the communication backbone of a distributed client/server communication system architecture while maintaining a rich array of call processing features.

SUMMARY

According to a broad aspect of a preferred embodiment of the invention, telephone calls, data and other multimedia information are routed through a switched network which includes transfer of information across the Internet and a satellite broadcast facility. A hybrid telecommunications system includes a switched communication network. A packet transmission network is coupled to the switched communications network. A call router is coupled to the switched communications network and the packet transmission network. A gateway server in communication with the call router provides file transfer services to a user connected to the switched communications network including routing over the Internet and satellite broadcasting facilities. The identity of the user is optionally authenticated by an authentication server.

In a further aspect of a preferred embodiment of the invention, an exterior packet filter is coupled to the call router and the gateway server. The exterior packet filter is configured to accept communications originating from a predetermined set of addresses.

In still another aspect of the invention, the gateway server is configured to route any messages larger than a certain size to a satellite broadcast facility if the messages are traveling more than 1000 miles.

In yet another aspect of the invention, a production token ring network is in communication with the gateway server. The production token ring network is optionally coupled to an interior packet filter configured to accept only communications originating from a predetermined set of addresses.

DETAILED DESCRIPTION

To assist in clarifying the technical subject matter of this application, a few terms are defined at the outset.

TABLE 1

Universal Terms

| Definition of terms | |
|---|---|
| Bandwidth | Measure of the amount of data passing through a network at a given time. |
| Bridge | A network bridge works on layer 2 of the OSI model. Thus, bridges are protocol independent. Network traffic is typically forwarded to correct bridge interfaces based on MAC address. |
| Distance Vector Multicast Routing Protocol (DVMRP) | DVMRP is the original IP Multicast routing protocol. It was designed to run over both multicast capable LANs (like Ethernet) as well as through non-multicast capable routers. In this case, the IP Multicast packets are "tunneled" through the routers as unicast packets. This replicates the packets and has an effect on performance but has provided an intermediate solution for IP Multicast routing on the Internet while router vendors decide to support native IP Multicast routing. |
| Duplex Communications | Two-way point to point communications. |
| Internet | A group of networks that are interconnected so that they appear to be one continuous network, and can be addressed seamlessly at the Network Layer Three of the OSI model. Also, the "Internet" (capital I) is the name given to the global network also known as the "World Wide Web". |
| Internet Group Management Protocol (IGMP) | IGMP was primarily designed for hosts on multi-access networks to inform locally attached routers of their group membership information. This is performed by hosts multicasting IGMP Host Membership Reports. Multicast routers listen for these messages and then can exchange group membership information with other multicast routers. This allows distribution trees to be formed to deliver multicast datagrams. The original version of IGMP was defined in RFC 1112. |
| Internet Protocols (IP) | An unreliable, connectionless datagram delivery service that allows networks to interact in a coherent manner and to pass data across multiple networks. The TCP/IP standard protocol defines the IP datagram as the unit of information passed across an Internet and provides the basis for connectionless packet delivery service. IP includes the ICMP control and error message protocol as an integral part. It provides the functional equivalent of ISO OSI Network Services. |
| Intranet | A subset of a larger network. An interconnected set of networks within a particular domain, such as a corporation, using IP or proprietary protocols to communicate between networks. |
| IP Address | The 32-bit address assigned to hosts that want to participate in a TCP/IP Internet. |
| IP datagram | The basic unit of information passed across a TCP/IP Internet. |
| Local Area Network (LAN) | A network physically confined to a small region of space, typically within a single building; contrasting with a Wide Area Network (WAN), which may be countrywide or even worldwide. |
| Multicast | IP-Multicast is the class-D addressing scheme in IP developed by Steve Deering at Xerox PARC. A set of Internet Protocols designed to allow point to multipoint distribution of data. |
| Multicast Address | An address, within a range of IP addresses, that identified the data as a multicast session. |
| Multimedia | Digital information intended to interface with the human senses. |
| Protocol Independent Multicast (PIM) | PIM was designed to take advantage of two existing multicast routing protocols, DVMRP and CBT. It exhibits the behavior of a protocol in a region of dense group membership flooding multicast packets using Reverse Path Multicasting, while also taking advantage of the work done for sparse group membership in Core Based Trees. Hence, the protocol has two modes, dense and sparse. |
| Protocol Independent Multicast - Sparse Mode (PIM-SM) | The Protocol Independent Multicast - Sparse Mode (PIM-SM) architecture:<br>• maintains the traditional IP multicast service model of receiver-initiated membership;<br>• uses explicit joins that propagate hop-by-hop from members' directly connected routers toward the distribution tree.<br>• builds a shared multicast distribution tree centered at a Rendezvous Point, and then builds source-specific trees for those sources whose data traffic warrants it.<br>• is not dependent on a specific unicast routing protocol;<br>• uses soft-state mechanisms to adapt to underlying network conditions and group dynamics.<br>The robustness, flexibility, and scaling properties of this architecture make it well suited to large heterogeneous internetworks. |
| Routers | An OSI network layer (Layer 3) device that can decide which of several paths network traffic will follow based on some optimality metric. Routers forward packets from one network to another, based on network layer information. |
| Simplex Communications | One-way communications. In a simplex environment, there is only a transmit or receive path available between two network components. |
| The OSI Model | The ISO seven-layer model attempts to provide a way of partitioning any computer network into independent modules from the lowest (physical) layer to the highest (application) layer. Many different specifications exist at each of these layers. |
| Tunneling | Encapsulation of network traffic at one interface for decapsulation by a peer interface. Also used to establish virtual connecting interfaces between subnets. |
| Unicast | Single destination addressing. |

TABLE 2

Multicast Network Terms

| Definition of Terms | |
|---|---|
| Administratively Scoped addresses | A range of Multicast addresses which are limited to intranet or other defined domains and which are not distributed to the general internet. |
| Application Clients | Network devices that request and receive multicast data from application servers. |
| Application Server | The server which originates the multicast distribution of a multicast application. |
| Boundary Routers | Routers which interface between the satellite insertion point and downstream clients. This is the first router the received multicast signal is distributed to. |
| Downstream Clients | Application Clients with a boundary router and possibly other routers, between them and the insertion point. |
| Downstream Routers | Routers located downstream of the boundary router. |
| GRE Tunneling | Generic Routing Encapsulation Tunneling protocol developed by Cisco that can encapsulate a wide variety of protocol packet types inside IP tunnels, creating a virtual point-to-point link to Cisco routers at remote points over an IP internet. By connecting multiprotocol subnetworks in a single-protocol backbone environment, IP tunneling using GRE allows network expansion across a single-protocol backbone environment. |
| Infolink | MCI's Intranet, based on IP. |
| Insertion Point | The point where a satellite receiver is attached to a LAN or other network component. |
| Insertion Point Clients | Application Clients that are directly connected to the insertion point LAN. |
| IPTV | A multicast application from Precept. |
| MMSE | MultiMedia Services Engineering |
| Operations LAN Segment | A LAN Segment which interfaces between the application server, the downstream clients and the Operations Router. |
| Operations Router | Interface router between Operations LAN Segment, Uplink LAN Segment and terrestrial network. |
| Satellite Transmission Path | The combined terrestrial and space segment path from the Uplink LAN to the receiving antenna. This path uses the dedicated telephony network route to the satellite uplink site, where the signal is inserted into the uplink signal for the appropriate satellite. The satellite broadcasts the signal to a 'footprint' that covers the Continental US with 'spot beams' aimed at Hawaii and Alaska. (spot beams optional) |
| Simplex Satellite Multicast | One-way communication over a satellite of a multicast datastream. |
| Uplink LAN | LAN connected to the Operations router. This LAN distributes multicast traffic to the satellite. |

TABLE 3

Multicast Applications Terms

| Definition of Terms | |
|---|---|
| CPU | The Processor or chip in a computer that carries out all the instructions of a program and controls all the other parts of a computer. |
| Decoder | A device for decompressing a compressed incoming bitstream, then splitting it into its audio and video components, and converting the data into analog signals for playback. |
| Encoder | A device that records, digitizes, and compresses analog audio and video content. |
| Frame Rate | The number of complete single video pictures that are streamed and measured on a per second basis. The acronym usually used is displayed as (fps). |
| Functional Testing | In System Testing, testing which attempts to find a discrepancy between a program and its specification. |
| Graphical User Interface | Graphical User Interface; an Interactive screen display where the user can move a Mouse to point the 'arrow' cursor at symbols (icons or buttons) that represent data or instructions to the machine, reducing the need for keyboard typing |
| I/O Operation | A task on a computer that reads and/or writes data to an external hardware device such as a CD-ROM, floppy disk, hard drive. |
| MPEG1 | An International Standards Organization (ISO) standards that addresses the methods for encoding video and audio at bandwidth rates of approximately 1.5 Mbps (suitable for CD-ROM). |
| Parallel Processing | The ability to achieve multiple tasks under a single PC configured with a single operating system simultaneously. |
| RAM | Random Access Memory. A device, often in the form of a chip (or set of chips) that stores Data and programs for immediate use by a CPU. The contents of RAM memory are normally lost when the machine is switched off. |
| Regression Testing | In System Testing, tests used to verify each new version of the system whenever that system is modified. It verifies the modification and investigates the impact of changes on the existing functions. |
| Streaming | A bit sequence of compressed digital video. |
| Video Resolution | The number of pixels per unit area with the greater the number of pixels represent the higher the resolution. |

Figure 1:
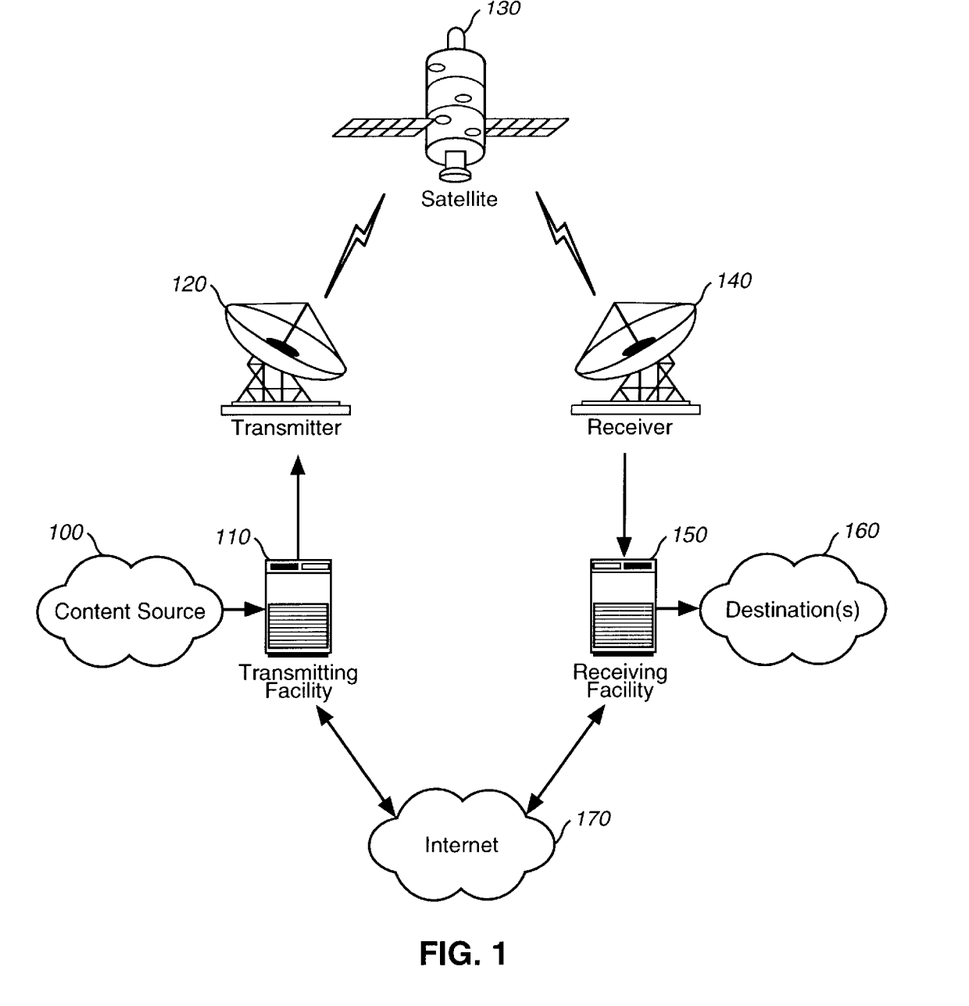
FIG. 1 illustrates the general topology of a Transmitting Facility and a Receiving Facility communicating via a network in accordance with a preferred embodiment.

FIG. 1 illustrates the general topology of a Transmitting Facility and a Receiving Facility communicating via a network in accordance with a preferred embodiment. The flow of data starts at a Content Source 100. The content may be in any one of a number of digital forms, including data files and real-time data streams. Data in every form and format is enabling. The data streams may be audio or video originating from local sources or international sources. The content is transmitted to a Transmitting Facility 110 via any one of a number of methods, including network, Internet, Intranet, or radio broadcast. The data is forwarded to a satellite transmitter 120, received and forwarded to an orbiting satellite 130, received by a satellite receiver 140 and forwarded to a Receiving Facility 150 and transmitted to one or a plurality of destinations 160. In the alternative, the path of transmission between the Transmitting Facility 110 and the Receiving Facility 150 may be via the Internet 170.

The Transmitting Facility 110 includes a Content Provider Facility and a Broadcast Operation Center. The Receiving Facility 150 includes a Downlink Gateway, Local Program Menu Database and Application Services Facility. The flow of data via the satellite links 120, 130, 140 is unidirectional, from the Transmitting Facility 110 to the Receiving Facility 150. The flow of data via the Internet 170 is unidirectional from the Transmitting Facility 110 to the Receiving Facility 150, however, data indicating the success or lack of success of all content transmissions is forwarded to the Transmitting Facility 110 via the Internet or Public Switched Telephone Network or ISDN at data transmission speeds ranging from 28.8 kilobytes per second to 1.5 megabytes per second.

Figure 2A:
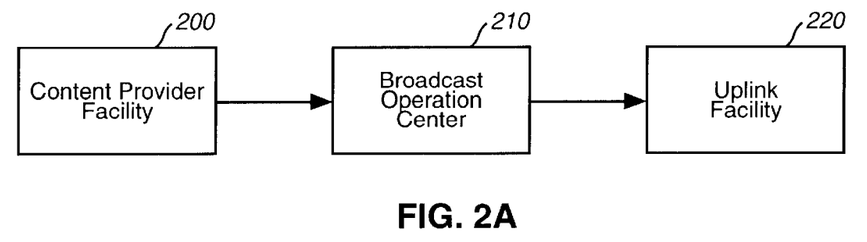
FIG. 2A illustrates the general topology of a Transmitting Facility.

FIG. 2A illustrates the general topology of a Transmitting Facility in accordance with a preferred embodiment. A Transmitting Facility includes three major functions. The Content Provider Facility 200, the Broadcast Operation Center 210, and the Uplink Facilities 220. Data is generated at the Content Provider Facility 200, is transmitted to the Broadcast Operation Center 210, and is transmitted to the Uplink Facility 220.

Figure 2B:
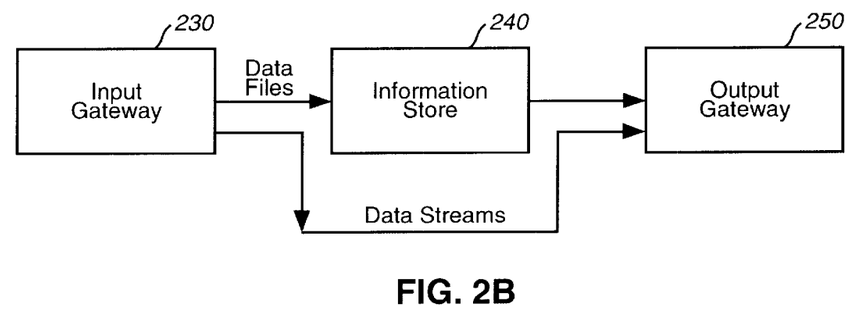
FIG. 2B illustrates the general topology of a Broadcast Operation Center.

FIG. 2B illustrates the general topology of a Broadcast Operation Center in accordance with a preferred embodiment. Data enters the Broadcast Operation Center through the Input Gateways 230, which includes a File Gateway, a Schedule Gateway and a Stream Gateway. Data Streams are forwarded to Output Gateways 250, which includes a Repair Server, a Playout Server, and shares the Stream Gateway with the Input Gateway 230. The Stream Gateway is shared by the Input Gateways 230 and the Output Gateways 250 to accommodate the urgent transmission requirements of stream data. Data Files are transmitted to an Information Store 240 and forwarded to the Output Gateways 250.

Figure 3:
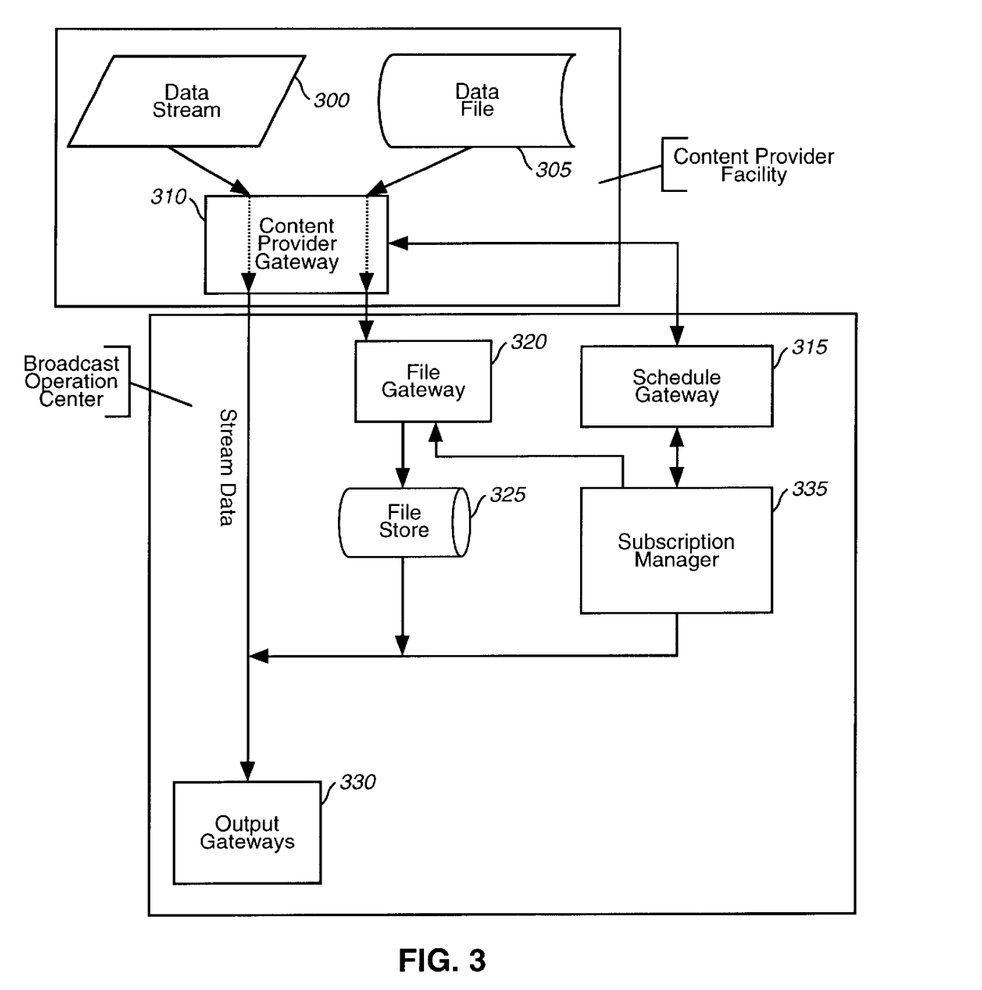
FIG. 3 illustrates the topology of a Content Provider Facility and a Broadcasting Operation Center including an Input Gateway, an Information Store and Output Gateways.

FIG. 3 illustrates the topology of a Content Provider Facility and a Broadcasting Operation Center including an Input Gateway, an Information Store and Output Gateways in accordance with a preferred embodiment. Data Streams 300 and Data Files 305 are received from external sources by a Content Provider Gateway 310. Data Streams 300 are assumed to be RTP/UDP unicast or multicast. Authentication and protection mechanisms, such as IPSEC, may be used. Data Files 305 are transmitted via a store-and-forward manner and using conventional file transfer and may be secured through use of IPSEC, SSL, or S-HTTP. The Content Provider Gateway 310 packages the data in packets for transmission to the Broadcast Operation Center. The Content Provider Facility will encrypt all data at the application level.

Data Streams 300 have a high priority as a function of the urgent or real-time nature of the data, and are transmitted to an Output Gateway 330 in the Broadcast Operation Center to speed passage of the data. Data Files 305 have lower priority than Data Streams 300 and are managed by the Broadcast Operation Center on a scheduled basis. The Content Provider Gateway 310 communicates to the Broadcast Operation Center via a network using TCP/IP protocol. The communication link between the Content Provider Gateway 310 in the Content Provider Facility and a Schedule Gateway 315 in the Broadcast Operation Center is a secure SSL or S-HTTP protocol.

The Content Provider Gateway 310 and the Schedule Gateway 315 exchange information on the scheduling of transmission of Data Files 305. More specifically, transmission of Data Files 305 is scheduled, revised and queried by the Schedule Gateway 315. The Content Provider Gateway 310 transmits scheduled Data Files 305 to the Schedule Gateway 315 via a network connection using Unicast, and either File Transfer Protocol (FTP) or IPSEC. A File Gateway 320 writes the Data Files 305 to a File Store 325, which is a data storage medium, and forwards the Data Files 305 to the Output Gateways 330 at the direction of a Subscription Manager 335. The Subscription Manager 335 transmits scheduling information to the Output Gateways 330.

Figure 4:
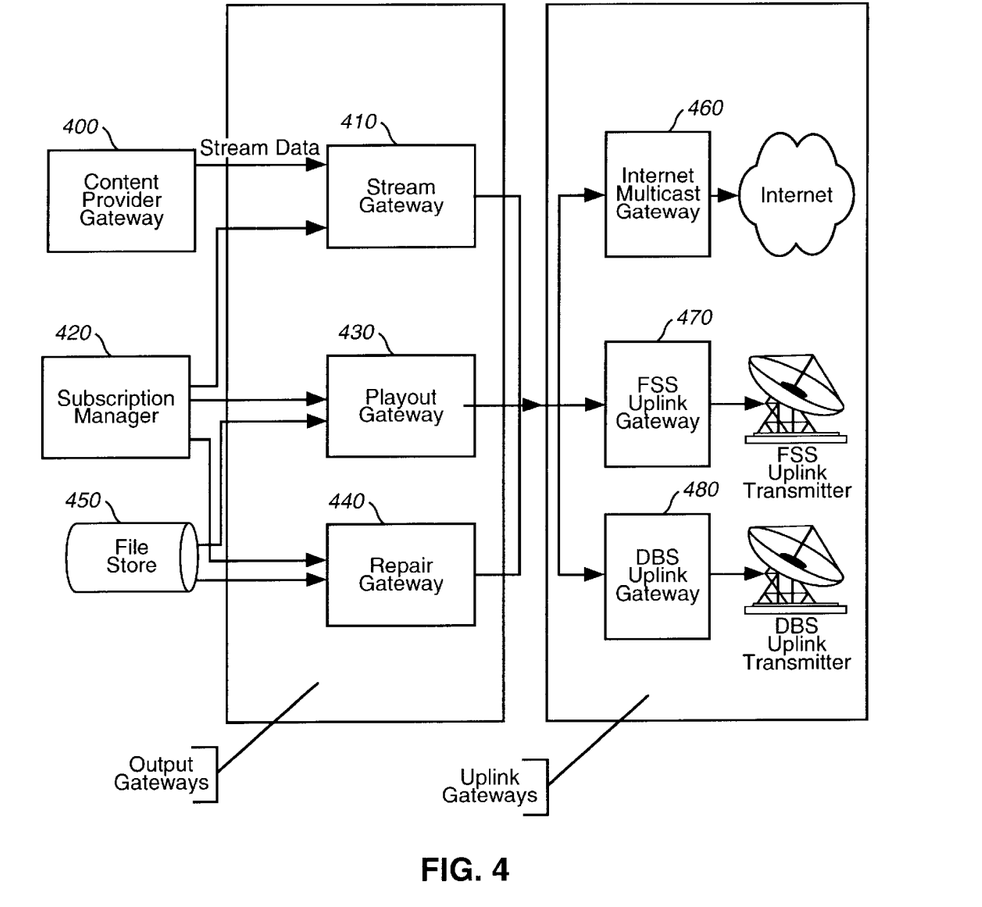
FIG. 4 illustrates Output Gateways communicating with an uplink Facility of the Transmitting Facility.

FIG. 4 illustrates the Output Gateways communicating with the Uplink Facility of the Transmitting Facility in accordance with a preferred embodiment. A Content Provider Gateway 400 transmits data streams to a Stream Gateway 410, circumventing the store-and-forward function that data files are subject to.

The Stream Gateway 410 functions as an FTP Proxy Gateway, which is an IP circuit gateway. A Subscription Manager 420 will transmit to the Stream Gateway 410, a Playout Gateway 430, and a Repair Gateway 440, information that uniquely identifies data that passes through each of the respective gateways, which enables the respective gateways to multiplex authentication and session information such as a unique identifier, the destination uplink, timing, multicast address, checksum, and format information into the data stream. Simultaneous delivery of data streams and data files at the destination can be coordinated by multiplexing authentication and session information in the data streams and data files accordingly.

The Stream Gateway 410 and the Playout Gateway 430 monitor the timeliness of data to the Uplink Gateways. The Playout Gateway 430 and the Repair Gateway 440 will retrieve data files from a File Store 450 as indicated by the Subscription Manager 420.

The Output Gateways will transmit data to the Uplink Gateway that is appropriate as indicated by the multiplexed session information, which is either an Internet Multicast Gateway 460, a Fixed Service Satellite (FSS) Uplink Gateway 470, or a Digital Broadcast Satellite (DBS) Uplink Gateway 480. Examples of DBS services are Direct TV and ASkyB. The Uplink Gateways will convert protocols and generate frames as appropriately indicated by the session information and the needs of the respective uplink facilities. Data is transmitted by the Stream Gateway 410 to the Uplink Gateways via RTP.

Figure 5:
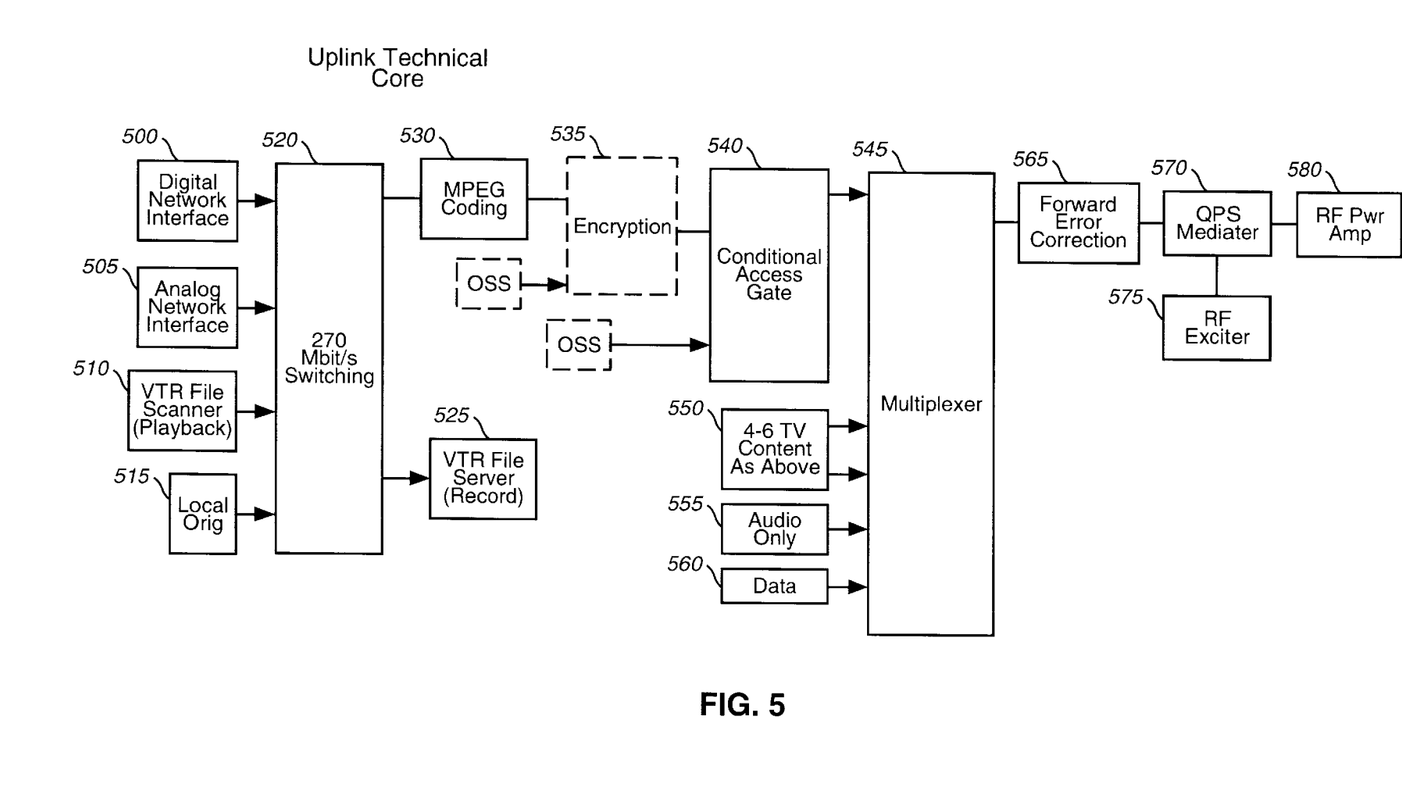
FIG. 5 illustrates an uplink technical core.

FIG. 5 illustrates the uplink technical core in accordance with a preferred embodiment. Data Files are transmitted by the Output Gateways of the Broadcast Operation Center of the Transmitting Facility via a Digital Network Interface 500, Data streams are transmitted via an Analog Network Interface 505, analog data is transmitted via video tape recorder 510, or Data is transmitted via a local content feed 515 into a 270 megabit per second network backbone 520. A record of each transmission is made to a video tape recorder server 525. The data is encoded to MPEG standards using an MPEG encoder 530 and encrypted using an encryptor 535.

The data is encrypted according to Conditional Access (CA) protocol at CA gate 540 and multiplexed by multiplexer 545 with authentication and session information, such as a unique identifier, the destination uplink, timing, multicast address, checksum, and format information, into the data stream. The multiplexed data is mixed with 4–6 television content 550, audio 555, and data 560. Forward Error Correction (FEC) is added to the data 565. The data 565 is transmitted and modulated according to Quadrature Phase Shift Keying (QPSK) specifications 570, a radio frequency (RF) exciter 575 intervenes in the data transmission, and a RF power amplifier 580 amplifies the data signal.

Figure 6:
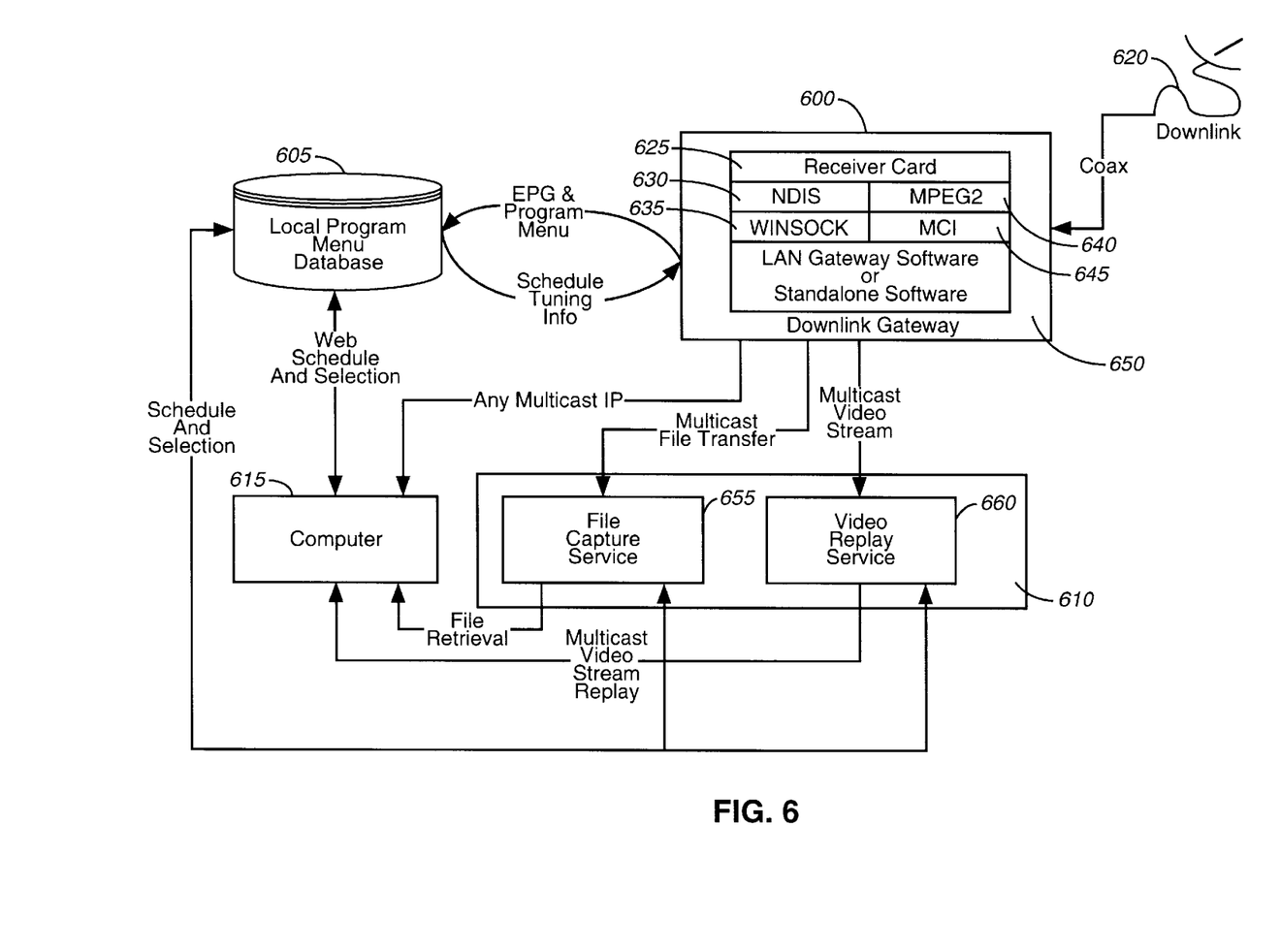
FIG. 6 illustrates a Receiving Facility.

FIG. 6 illustrates the Receiving Facility in accordance with a preferred embodiment. The Receiving Facility includes four primary components: a Local Program Menu Database 605, Application Services 610 one or more client computers 615, and a Downlink Gateway 620. Data that is received by the satellite receiver 140, FIG. 1, is transmitted to a Satellite Downlink Gateway 600. The satellite receiver 140 is connected to the Satellite Downlink Gateway 600 via a coaxial cable, which is a type of cable with a solid central conductor surrounded by an insulator that is surrounded by a cylindrical shield woven from fine wires. The shield is usually connected to electrical ground to reduce electrical interference. The Satellite Downlink Gateway 600 removes from the data the satellite protocols and frames that were added to the data by the uplink facilities before satellite transmission, yielding the data multiplexed with the authentication and session information. The Satellite Downlink Gateway 600 includes one or more Receiver Cards 625 that include a tuner, tuner control and satellite decoders.

The data is transmitted by the Receiver Card(s) 625 to a NDIS 630 and a WINSOCK 635 layers of software or through a MPEG-2 compliant 640 and a MCI compliant 645 layers of software. Then the data is reformed into IP packets for transmission on a local area network, or not reformed, as indicated by the multiplexed destination information in the data 650. The data is transmitted either directly to the client computer 615 using a multicast IP protocol, or indirectly to one or more client computers 615 through the Application Services 610 via a File Capture Service 655 using a file retrieval mechanism where the data is files or a Video Replay Service 660 using a multicast video stream replay mechanism where the data is a stream.

The Local Program Menu Database 605 controls which data is transmitted at what time based on authentication and session information multiplexed into the data between the Satellite Downlink Gateway 600, the Application Services 610 and one or more client computers 615.

Figure 7:
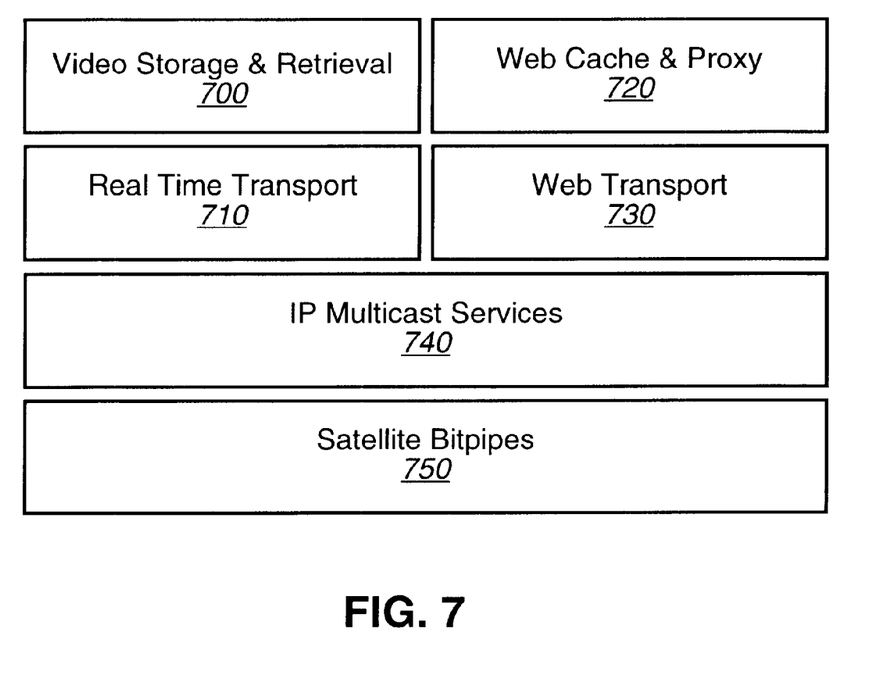
FIG. 7 illustrates a layered system architecture.

FIG. 7 illustrates the layered system architecture in accordance with a preferred embodiment. Stream data is managed at the highest level by video storage and retrieval services 700 that is supported by lower level real time transport 710 of the stream data. In comparison, data files are managed by caching and proxy services 720 that is in turn supported by Web Transport 730 Internet Protocols. All data services are supported by IP Multicast Services 740, which are ultimately supported by satellite bitpipes 750.

Figure 8:
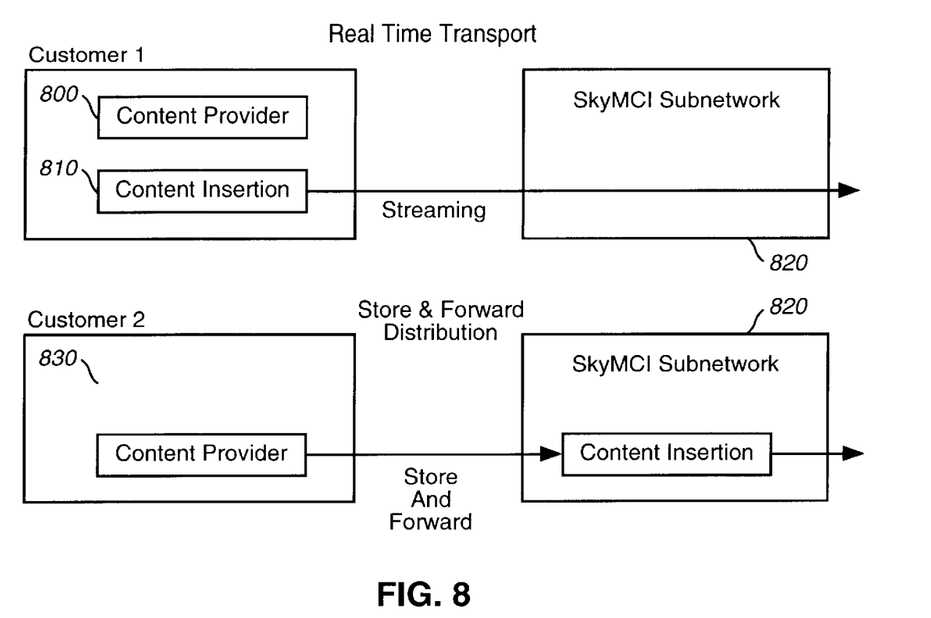
FIG. 8 illustrates an application services layer.

FIG. 8 illustrates the application services layer in accordance with a preferred embodiment. In an application of stream data, the Content Provider 800 inserts stream data 810 into the delivery subnetwork 820. In comparison, in an application of file data, the Content Provider 830 inserts file data into the delivery subnetwork 820 where the data may be stored for a period of time and then forwarded through the delivery subnetwork 820.

Figure 9:
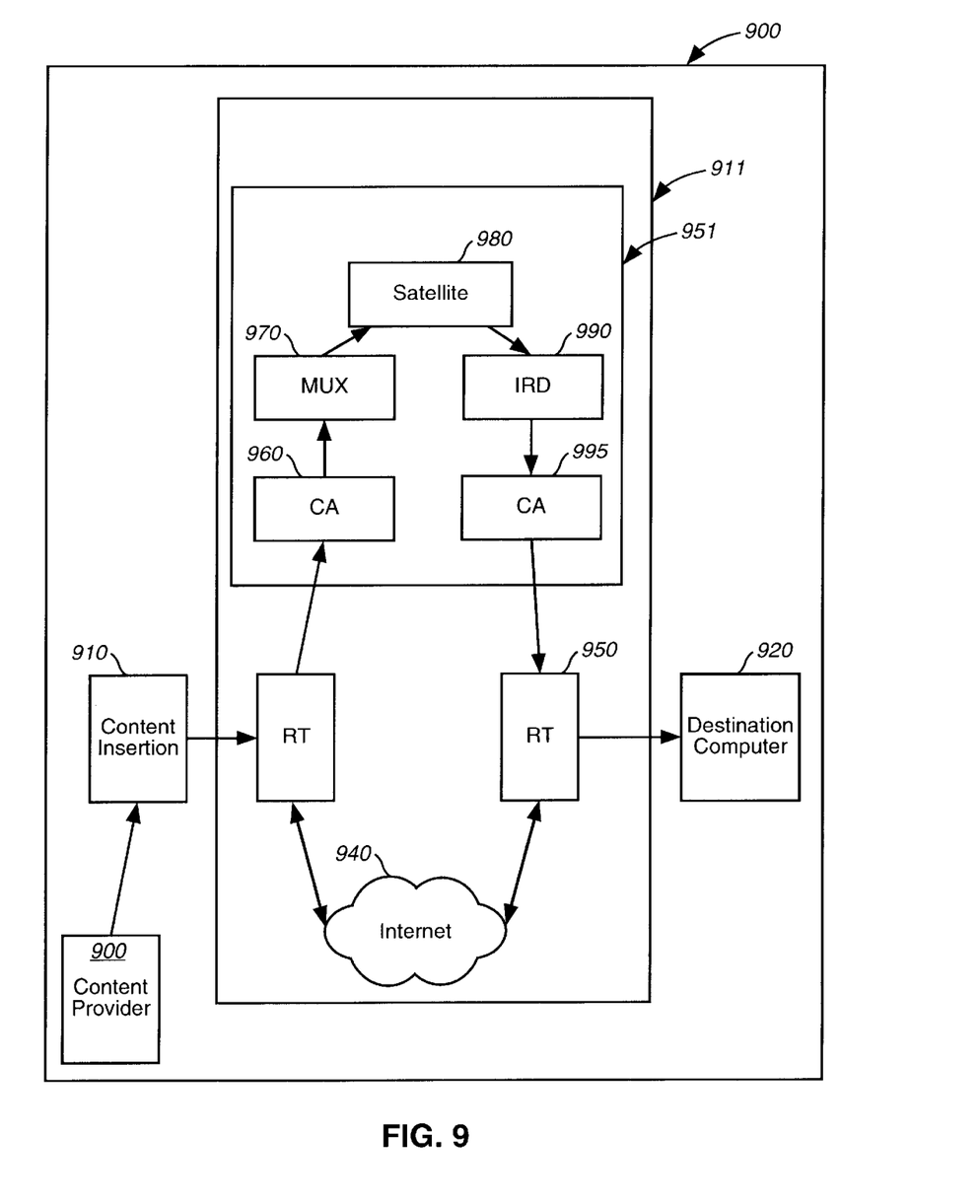
FIG. 9 illustrates a functional decomposition of architectural layers.

FIG. 9 illustrates the functional decomposition of architectural layers in accordance with a preferred embodiment. At an Application level 900 of the system function, a content provider 901 performs content insertion 910 into an Internetwork 911, the data is transmitted through the Internetwork 911 to a destination computer 920. At the Internetwork 911 level, the incoming data is routed by router 930 either to the subnetwork or the Internet 940. Upon passage through either route, it is lastly routed by router 950 to the destination computer 920. At the Subnetwork 951 level, the incoming data is received by a conditional access (CA) device 960, and transmitted to a multiplexer (MUX) 970 in preparation for satellite transmission, then it is transmitted through a satellite 980 to an Integrated Receiver Decoder (IRD) 990, and transmitted to a conditional access (CA) device 995 and then transmitted to the router 950, and lastly to the destination computer 920.

| Boundary Router In Accordance With A Preferred Embodiment | | |
|---|---|---|
| Cisco 2509 | Running 11.0.11 | |
| Global Setup: | IP Multicast Routing | |
| Protocol Setup: | Static Route Distribution | 166.34.120.128 |
| | OSPF | |
| Interface Setup: | Insertion Point LAN | 166.34.120.33-PIM |
| | Segment | 166.34.120.255-PIM |
| | Downstream LAN | 166.34.120.225-NO PIM |
| | Segment | |
| | GRE Tunnel | |

The source code for a downstream router in accordance with a preferred embodiment is provided below as an aid in teaching one of ordinary skill in the art to make and use the invention.

```
version 11.0
service udp-small-servers
service tcp-small-servers
!
hostname 2509A
!
!
enable password sky
ip multicast-routing
ip dvmrp route-limit 7000
!
interface Tunnel0
ip unnumbered Serial0
tunnel source 166.34.120.225
tunnel destination 166.35.252.52
!
interface Ethernet0
ip address 166.34.120.33 255.255.255.224
ip pim dense-mode
!
interface Serial0
ip address 166.34.120.225 255.255.255.224
ip pim dense-mode
bandwidth 2000
no cdp enable
!
interface Serial1
no ip address
shutdown
!
router ospf 200
redistribute static subnets
network 166.34.0.0 0.0.255.255 area 0.0.0.0
!
``` ip domain-name rch.mci.com
ip name-server 166.35.191.120
ip classless
ip route 0.0.0.0 0.0.0.0 166.34.120.226
ip route 166.34.120.128 255.255.255.224 Tunnel0
ip ospf name-lookup
ip mroute 166.34.120.128 255.255.255.224 166.34.120.32
no logging console
access-list 100 permit icmp any any
access-list 100 deny ip any host 224.0.0.5
access-list 100 permit ip host 166.34.120.226 any
!
!
line con 0
password sky
line 1 8
transport input all
line aux 0
transport input all
line vty 0 1
password sky
login
length 18
line vty24
password sky
login
!
ntp source Serial0
end

| Downstream Router In Accordance With A Preferred Embodiment | | |
|---|---|---|
| Cisco 2509 | Running 11.1.6 | |
| Global Setup: | IP Multicast Routing | |
| Protocol Setup: | OSPF | |
| Interface Setup: | Upstream LAN Segment | 166.34.120.226-PIM |
| | Downstream LAN Segment | 166.34.119.162-PIM |

The source code for a downstream router in accordance with a preferred embodiment is provided below as an aid in teaching one of ordinary skill in the art to make and use the invention.

version 11.1
service udp-small-servers
service tcp-small-servers
!
hostname 2509B
!
enable password sky
!
ip multicast-routing
ip dvmrp route-limit 7000
!
interface Ethernet0
ip address 166.34.119.162 255.255.255.240
ip pim dense-mode
!
interface Serial0
ip address 166.34.120.226 255.255.255.224
ip pim dense-mode
bandwidth 2000
clockrate 2000000
!
interface Serial1
no ip address
bandwidth 1500
shutdown
clockrate 2000000
!
router ospf 200
network 166.34.0.0 0.0.255.255 area 0
!
ip domain-name rch.mci.com
ip name-server 166.35.191.120
ip classless
no logging console
access-list 100 permit icmp any any
!
line con 0
password sky
line 1 8
line aux 0
line vty 0
password sky
login
length 18
line vty 1 4
password sky
login
!
ntp clock-period 17180064
ntp source Ethernet0
end While the invention is described in terms of preferred embodiments in a specific system environment, those skilled in the art will recognize that the invention can be practiced, with modification, in other and different hardware and software environments within the spirit and scope of the appended claims.

What is claimed is:

1. A method for transmitting data via a hybrid telecommunications system that includes a switched communications network, a satellite broadcast facility, and a packet transmission network, the method comprising:
    forwarding data files and data streams from a content provider facility;
    receiving the data files and the data streams at a broadcast operation center, the receiving the data files and the data streams including:
        receiving the data files and the data streams from the content provider facility at an input gateway,
        exchanging scheduling information between the content provider facility and the input gateway,
        storing the data files in the storage device for forwarding to an output gateway of the broadcast operation center based on the scheduling information, and forwarding the data streams to the output gateway without storing the data streams in the storage device; and transmitting the data files and the data streams from the output gateway to at least one client via the switched communications network.

2. The method of claim 1, wherein the forwarding data files and data streams further comprises:

facilitating communication between the content provider facility and the broadcast operation center, wherein the facilitating comprises:

transmitting at least one data stream and at least one data file to the broadcast operation center using a content provider gateway; and scheduling at least one transmission with the broadcast operation center.

3. The method of claim 1, wherein the receiving the data files and the data streams further comprises:

storing the scheduling information and subscription information in the storage device.

4. The method of claim 3 further comprising:

receiving the data files at a file gateway of the input gateway;

forwarding the data files from the file gateway to the storage device;

receiving the scheduling information at the file gateway;

receiving at least one data stream from the content provider facility at a stream gateway of the output gateway; and transmitting the at least one data stream to the uplink gateway.

5. The method of claim 1, further comprising:

receiving the data files at a downlink gateway of a reception facility from the satellite broadcast facility via the switched communications network;

exchanging scheduling information between the downlink gateway and a local program menu database; and transmitting the data files from the downlink gateway to at least one application service and at least one computer in response to the exchanged scheduling information.

6. A hybrid telecommunications system for media communication that includes a network, the system comprising:

a packet transmission network coupled to the network and including:

an input gateway that receives data files and the data streams and exchanges scheduling information regarding at least one of the data files and the data streams, an information storage device that stores the data files, and an output gateway that obtains the files according to the scheduling information and transmits the data files and the data streams to a reception facility via the network;

a satellite broadcast facility, coupled between the network and the packet transmission network, that broadcasts the data files and the data streams;

a call router coupled to the network and the packet transmission network that routes the data files and the data streams; and a gateway server in communication with the call router configured to provide data transfer services to at least one user connected to the network.

7. The system of claim 6, wherein the packet transmission network comprises:

a content provider facility that forwards the data files and the data streams; and a broadcast operation center that receives the data files and the data streams from the content provider facility and transmits the data files and the data streams to at least one client at appropriate times via the network, the broadcast operation center including the input gateway, the information storage device, and the output gateway.

8. The system of claim 7, wherein the content provider facility comprises a content provider gateway that facilitates communication between the content provider facility and the broadcast operation center by transmitting at least one data stream and at least one data file to the broadcast operation center and scheduling transmissions with the broadcast operation center.

9. The system of claim 8, wherein the input gateway receives the data files and the data streams from the content provider facility and transmits scheduling information to and receives scheduling information from the content provider facility, the information storage device also stores schedule and subscription information, and the output gateway transmits the data streams from the broadcast operation center to the reception facility via the network.

10. The system of claim 9, wherein the input gateway comprises:

a file gateway that receives the data files transmitted to the broadcast operation center and forwards the data files to the information storage device and receives the scheduling information;

a schedule gateway that exchanges scheduling information with the content provider facility; and a stream gateway that receives at least one data stream from the content provider facility and transmits the at least one data stream to the output gateway and receives scheduling information from the information storage device.

11. The system of claim 6, wherein the reception facility comprises a downlink gateway that receives at least one data packet from the packet transmission network via the network and transmits and receives scheduling information having a local program menu data.

12. A system for delivering data from a content source to at least one destination comprising:

a transmitting facility coupled to the content source and comprising:

a content provider facility for forwarding data that includes data files and data streams, and a broadcast operation center coupled to the content provider facility for receiving the data from the content provider facility;

a transmission means in communication with the transmitting facility for transmitting data; and a receiving facility for receiving data and forwarding the data to the at least one destination in accordance with a predetermined schedule;

wherein the content provider facility in combination with the broadcast operation center includes:

a content provider gateway that facilitates communication between the content provider facility and the broadcast operation center by transmitting data to the broadcast operation center and scheduling transmissions with the broadcast operation center, an input gateway that receives data from the content provider facility and exchanges scheduling information with the content provider facility, and an output gateway that receives data files from the input gateway based on the scheduling information and according to a first transmission technique and data streams from the input gateway according to a second transmission technique and transmits data from the broadcast operation center to the receiving facility.

13. The system of claim 12, wherein the first transmission technique is a store-and-forward technique.

14. The system of claim 13, wherein the second transmission technique is a direct forwarding technique.

* * * * *